US012383773B2

(12) United States Patent
Dwyer et al.

(10) Patent No.: US 12,383,773 B2
(45) Date of Patent: *Aug. 12, 2025

(54) FILTER CARTRIDGE HOLDER WITH FIT-CHECK DEVICE

(71) Applicant: 3M INNOVATIVE PROPERTIES COMPANY, St. Paul, MN (US)

(72) Inventors: Gary E. Dwyer, Mallorytown (CA); Pierre Legare, Brockville (CA)

(73) Assignee: 3M Innovative Properties Company, St. Paul, MN (US)

( * ) Notice: Subject to any disclaimer, the term of this patent is extended or adjusted under 35 U.S.C. 154(b) by 938 days.

This patent is subject to a terminal disclaimer.

(21) Appl. No.: 17/530,129

(22) Filed: Nov. 18, 2021

(65) Prior Publication Data

US 2022/0072346 A1 Mar. 10, 2022

Related U.S. Application Data

(63) Continuation of application No. 15/777,472, filed as application No. PCT/US2016/061969 on Nov. 15, 2016, now Pat. No. 11,219,788.

(60) Provisional application No. 62/257,531, filed on Nov. 19, 2015.

(51) Int. Cl.

| | |
|---|---|
| ***A62B 23/02*** | (2006.01) |
| ***A62B 19/00*** | (2006.01) |
| ***A62B 27/00*** | (2006.01) |
| *A62B 9/02* | (2006.01) |

(52) U.S. Cl.

CPC .............. *A62B 23/02* (2013.01); *A62B 19/00* (2013.01); *A62B 27/00* (2013.01); *A62B 9/02* (2013.01)

(58) Field of Classification Search

CPC ......... A62B 19/00; A62B 23/02; A62B 27/00; A62B 7/10; A62B 9/02

See application file for complete search history.

(56) References Cited

U.S. PATENT DOCUMENTS

| | | | |
|---|---|---|---|
| 3,216,578 | A | 11/1965 | Wright |
| RE30,782 | E | 10/1981 | Van Turnhout |
| 4,813,948 | A | 3/1989 | Insley |
| 5,230,800 | A | 7/1993 | Nelson |
| 5,669,375 | A | 9/1997 | Dahrendorf |
| 6,408,845 | B1 | 6/2002 | Pereira |
| 7,210,477 | B2 | 5/2007 | Templeton |

(Continued)

FOREIGN PATENT DOCUMENTS

| | | |
|---|---|---|
| JP | 60-99947 | 7/1985 |
| JP | S60-099946 | 7/1985 |

(Continued)

OTHER PUBLICATIONS

International Search Report for PCT International Application No. PCT/US2016/061969, mailed on Feb. 16, 2017, 3 pages.

*Primary Examiner* — Bradley H Philips
(74) *Attorney, Agent, or Firm* — Kenneth B. Wood

(57) ABSTRACT

A cartridge holder for a respirator, the cartridge holder including a fit-check device with a sealing platen that can be actuated between a first, unsealed position and a second, sealed position in which at least a portion of the sealing platen contacts a major surface of a disposable filter cartridge within the cartridge holder so as to prevent airflow through the disposable filter cartridge.

14 Claims, 8 Drawing Sheets

(56) References Cited

U.S. PATENT DOCUMENTS

| | | | | |
|---|---|---|---|---|
| 7,419,526 | B2 * | 9/2008 | Greer | B01D 46/30 55/DIG. 35 |
| 8,162,153 | B2 | 4/2012 | Fox | |
| 9,440,775 | B2 | 9/2016 | Dwyer | |
| 11,219,788 | B2 * | 1/2022 | Dwyer | A62B 27/00 |
| 2004/0011204 | A1 | 1/2004 | Both | |
| 2008/0038976 | A1 | 2/2008 | Berrigan | |
| 2011/0284006 | A1 * | 11/2011 | Legare | A62B 7/10 128/205.27 |
| 2014/0216474 | A1 | 8/2014 | Middlestadt | |
| 2014/0261437 | A1 * | 9/2014 | Catanzarite | A62B 19/00 128/206.17 |
| 2015/0107596 | A1 | 4/2015 | Mashiko | |
| 2015/0314147 | A1 * | 11/2015 | Fleming | A62B 7/10 128/206.17 |

FOREIGN PATENT DOCUMENTS

| | | |
|---|---|---|
| JP | H04-018584 | 4/1992 |
| JP | 2002-126111 | 5/2002 |
| JP | 2007-181570 | 7/2007 |
| JP | 2008-246113 | 10/2008 |
| JP | 2010-03560202 | 2/2010 |
| WO | WO 2012/100116 | 7/2012 |
| WO | WO 2013/187278 | 12/2013 |
| WO | WO 2013/187279 | 12/2013 |
| WO | WO 2014/120500 | 8/2014 |
| WO | WO 2014/163772 | 10/2014 |
| WO | WO 2015/166212 | 11/2015 |
| WO | WO 2015/179141 | 11/2015 |
| WO | WO 2016/119080 | 8/2016 |
| WO | WO 2017/004313 | 1/2017 |

* cited by examiner

FILTER CARTRIDGE HOLDER WITH FIT-CHECK DEVICE

This application is a continuation of U.S. patent application Ser. No. 15/777,472 (published as U.S. Patent Application Publication No. 2018/0353783, and now allowed), which was a national stage filing under 35 U.S.C. 371 of PCT Application No. PCT/US2016/061969 (published as International Publication No. WO2017/087353), which claimed priority to U.S. Provisional Application No. 62/257,531, the disclosures of all of which are incorporated by reference in their entirety herein.

BACKGROUND

Respirators are often used for cleansing air to be breathed by a user, and commonly include a mask body along with one or more filter units that are attached to the respirator body.

SUMMARY

In broad summary, herein are disclosed filter cartridge holders that include a fit-check device with a sealing platen that can be actuated between a first, unsealed position and a second, sealed position in which at least a portion of the sealing platen contacts a major surface of a disposable filter cartridge within the cartridge holder so as to prevent airflow through the disposable filter cartridge. Also disclosed are respirators that make use of such cartridge holders, and disposable filter cartridges that are configured for use in such cartridge holders. These and other aspects will be apparent from the detailed description below. In no event, however, should this summary be construed to limit the claimable subject matter, whether such subject matter is presented in claims in the application as initially filed or in claims that are amended or otherwise presented in prosecution.

Figure 1:
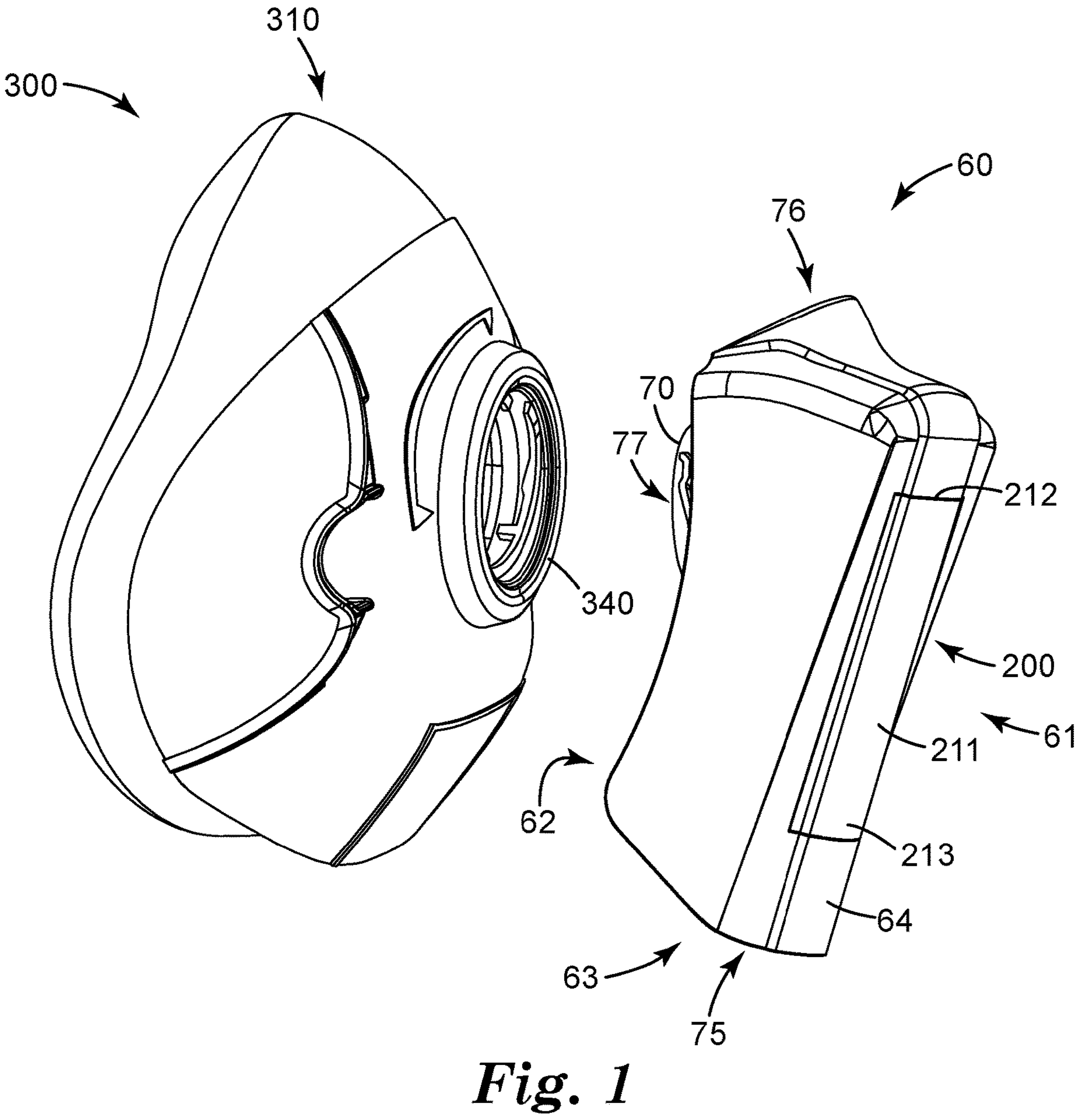
FIG. 1 is a side-front partially exploded perspective view of an exemplary respirator comprising an exemplary cartridge holder.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as "top", bottom", "upper", lower", "under", "over", "up" and "down", and "first" and "second" may be used in this disclosure, it should be understood that those terms are used in their relative sense only unless otherwise noted.

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The term "substantially", unless otherwise specifically defined, means to a high degree of approximation (e.g., within +/−10% for quantifiable properties) but again without requiring absolute precision or a perfect match. Terms such as same, equal, uniform, constant, strictly, and the like, are understood to be within the usual tolerances or measuring error applicable to the particular circumstance rather than requiring absolute precision or a perfect match.

GLOSSARY

"Front", "frontward", "forward", "forward-facing", "forwardmost", and like terms are defined with respect to a respirator in which an item is used, and denote a direction generally away from the face of a user wearing the respirator. "Rear", "rearward", and like terms denote a direction generally toward the face of a user wearing the respirator.

Terms such as "inside", "inward", and the like, are defined with respect to a filter cartridge, and denote a direction toward the interior of a filter cartridge. Terms such as "outside", "outward", and the like, denote a direction away from the interior of a filter cartridge.

By "air-permeable" is meant an item (e.g., a sheetlike layer) or an area of an item that permits airflow therethrough, which may be achieved by any conventional means, e.g. the providing of perforated through-holes and the like.

By "air-impermeable" is meant an item or an area of an item (whether continuous or discontinuous) that does not permit airflow therethrough.

By "seal", "sealed", "sealing" and like expressions is meant to directly contact at least a portion of a major surface of a disposable filter cartridge so as to physically block (occlude) an otherwise air-permeable area of the major surface of the cartridge so that air cannot flow therethrough. Such sealing can be performed e.g. by blocking air from reaching a perforated area of the major surface of the item (e.g. by sealing around the perimeter of the perforated area) and/or by individually blocking all of the through-holes of the perforated area.

"Upstream" refers to portions of a pathway followed by flowing (unfiltered) air prior to the air entering a filter cartridge; "downstream" refers to portions of a pathway followed by flowing (filtered) air after the air has exited the filter cartridge.

DETAILED DESCRIPTION

Figure 2:
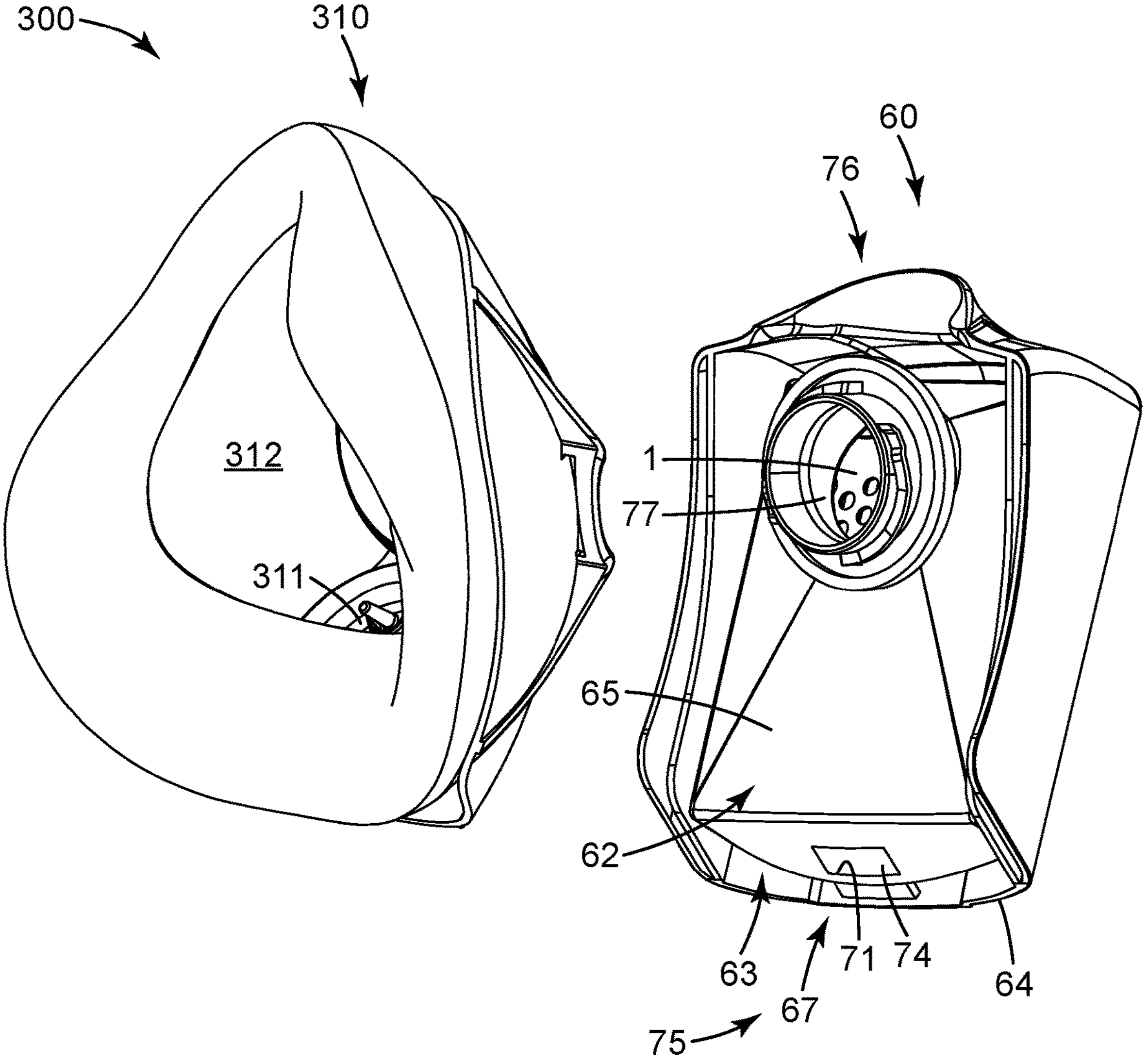
FIG. 2 is a side-rear partially exploded perspective view of the exemplary respirator of FIG. 1.
Figure 3:
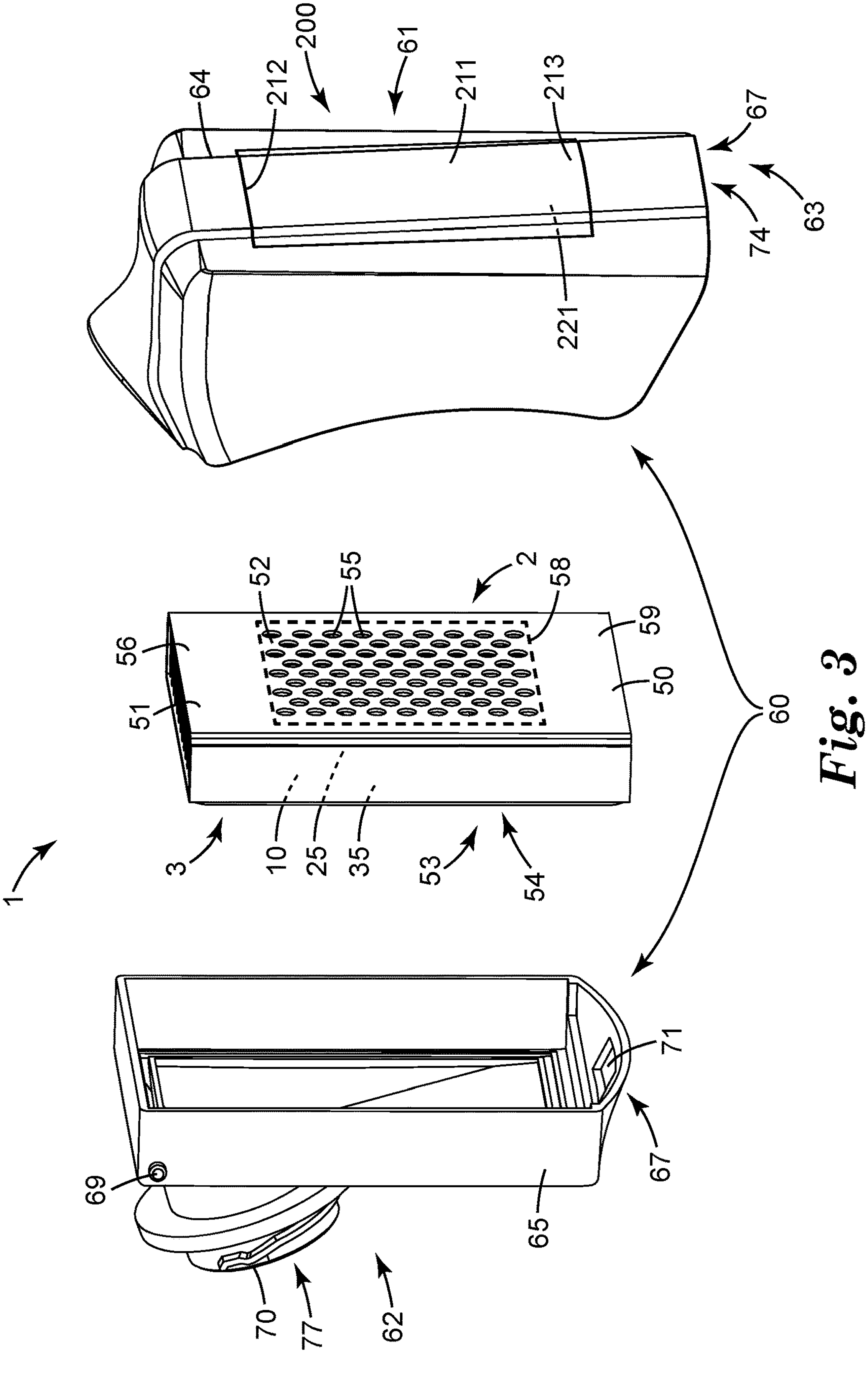
FIG. 3 is a side-front partially exploded perspective view of an exemplary cartridge holder and an exemplary disposable filter cartridge.

Shown in FIG. 1 in side-front partially exploded perspective view, and in FIG. 2 in side-rear partially exploded perspective view, is an exemplary respirator 300 that comprises a disposable filter cartridge 1 that is installed within a cartridge holder 60 that is in fluid communication with a mask body 310 of respirator 300. FIG. 3 presents a side-front partially exploded perspective view of an exemplary cartridge holder 60 and exemplary disposable filter cartridge 1 as installed within cartridge holder 60. Cartridge holder 60 is configured to securely hold disposable filter cartridge 1 therein during use of respirator 300. Disposable filter cartridge 1 is distinguished from cartridge holder 60 in that filter cartridge 1 is configured to be disposed and replaced at appropriate times (e.g. when spent) in ordinary use of respirator 300 (noting that the term disposable is broadly used to encompass e.g. disposing, recycling, and so on). In contrast, cartridge holder 60 is a non-disposable component of respirator 300, meaning that although cartridge holder 60 may be detachable from mask body 310 of respirator 300, cartridge holder 60 will not be replaced in ordinary use of respirator 300 but rather will only be replaced in the event that e.g. some damage, significant wear, or the like, occurs to cartridge holder 60. Although a replacement cartridge holder 60 may be obtained in such circumstances (rather than a user having to e.g. obtain an entirely new respirator 300), the ordinary artisan with background knowledge of respirators will appreciate this fundamental difference between cartridge holder 60 and disposable filter cartridge 1.

Figure 4:
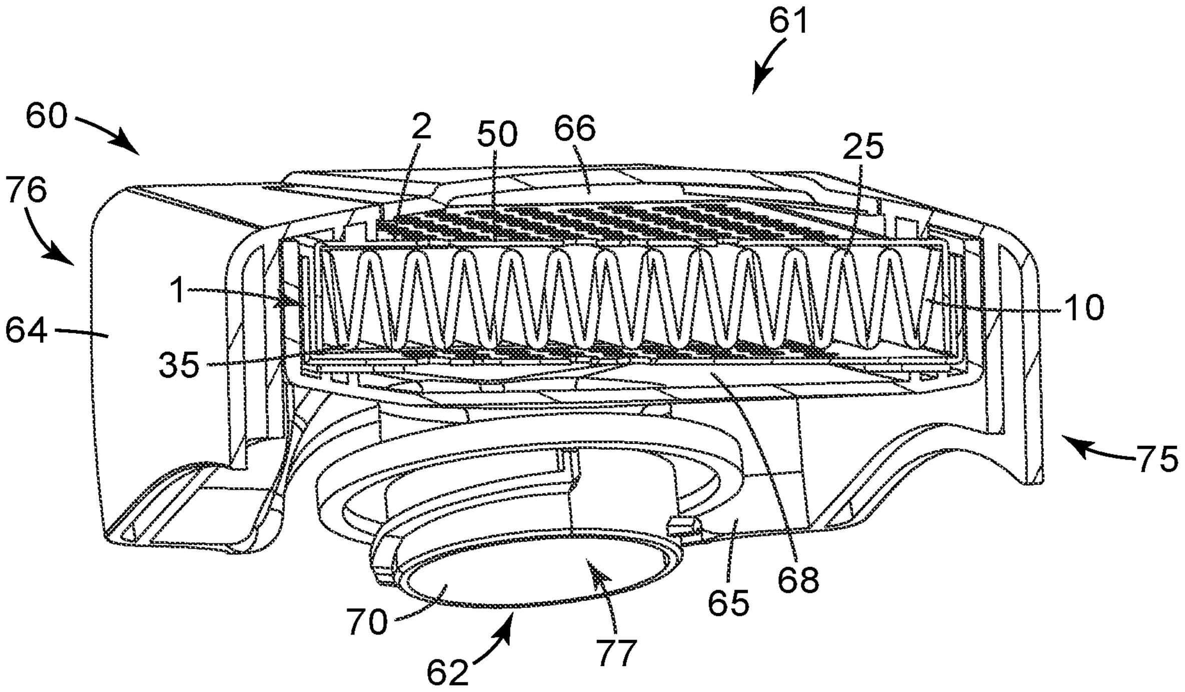
FIG. 4 is a cross-sectional slice view of an exemplary cartridge holder with an exemplary disposable filter cartridge installed therein.
Figure 5A:
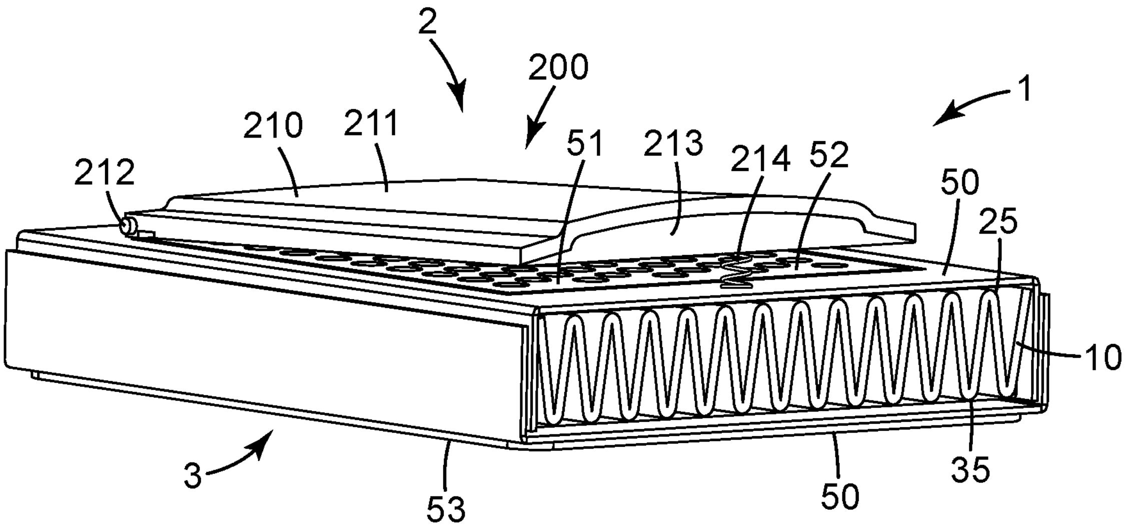
FIG. 5*a* is a side-front perspective isolated view of an exemplary sealing platen shown in a first, unsealed position relative to an exemplary disposable filter cartridge.
Figure 5B:
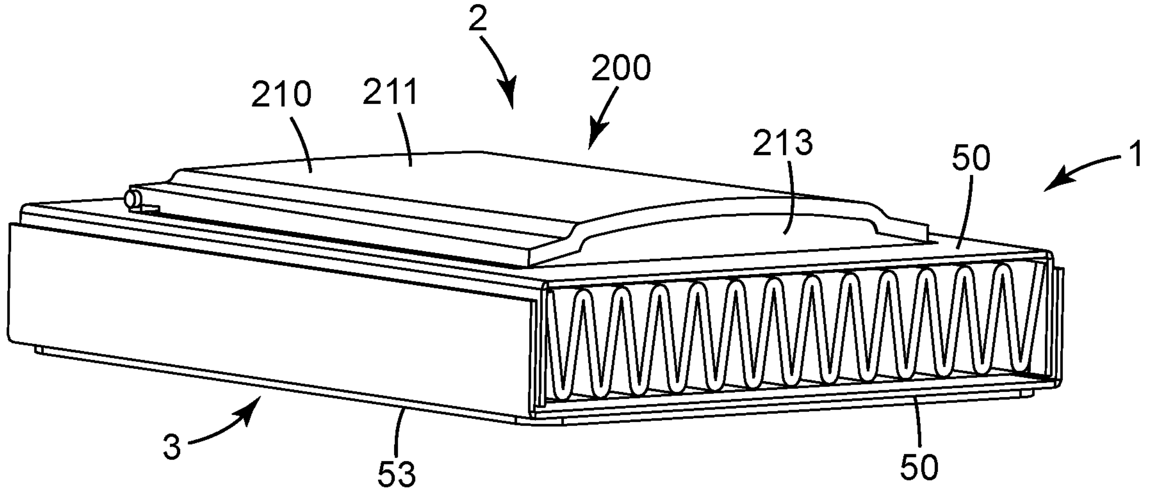
FIG. 5*b* is a side-front perspective isolated view of an exemplary sealing platen shown in a second, sealed position relative to an exemplary disposable filter cartridge.
Figure 6:
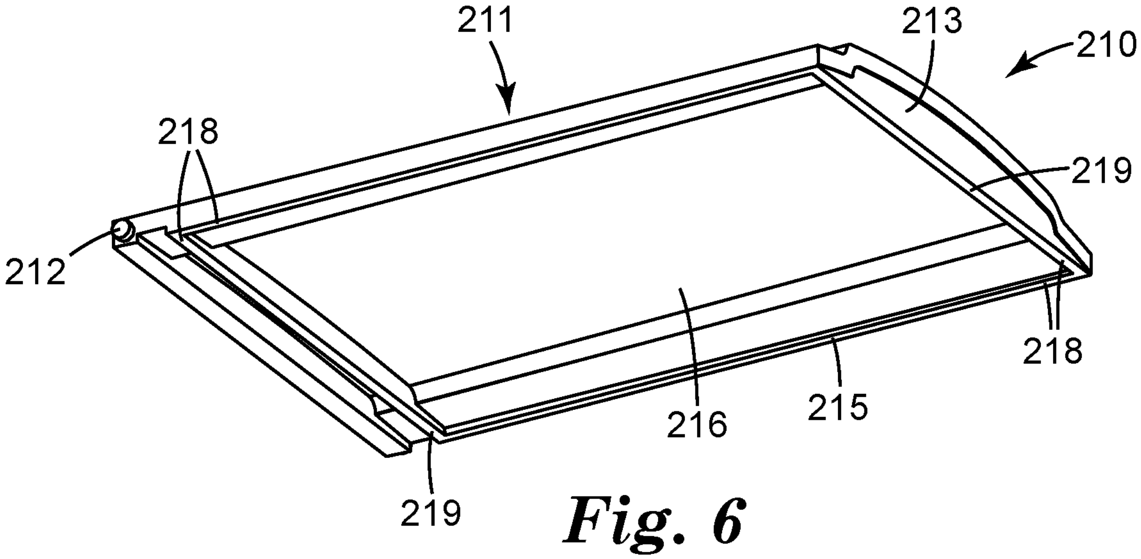
FIG. 6 is a side-rear perspective isolated view of the exemplary sealing platen of FIGS. 5*a* and 5*b*.

A disposable filter cartridge 1 as shown in exemplary embodiment e.g. in FIGS. 3 and 4, comprises air filter media 10 (most easily visible in FIG. 4) that is at least partially encased in a casing 50. In some embodiments filter cartridge 1 may be rectangular in shape (which specifically includes square shapes) with e.g. four corners. Filter cartridge 1 comprises a first major face/side 2 and a second major face/side 3; filter media 10 thus comprises a first major side 25 and a second major side 35. In many embodiments, filter cartridge 1 may be front-rear symmetrical, so that it may be installed in a filter cartridge holder with first major side 2 facing frontwards, or with second major side 3 facing frontwards. That is, in such embodiments airflow may enter filter cartridge 1 on the first major side 2 and exit on the second major side 3, or vice versa. It will thus be appreciated that any designation of first and second major sides/faces of media 10 and filter cartridge 1 is used for convenience of description and does not imply that the major sides/faces must necessarily differ in any substantial way.

Filter cartridge casing 50 is a part of disposable filter cartridge 1 and is permanently attached (directly or indirectly) to filter media 10. Thus by definition casing 50 is not a part of cartridge holder 60. Filter cartridge casing 50 comprises a first major portion 51 that that resides outwardly of the first major side 25 of the filter media and that has a major front surface 59 that provides the major front surface of filter cartridge 1. First major portion 51 of casing 50 includes a first air-permeable area 52 (with perimeter 58), in which area casing 50 is provided with a plurality of through-holes 55. In some embodiments, major portion 51 of casing 50 may have a non-air-permeable (e.g. non-perforated) picture-frame border 56 that surrounds air-permeable (e.g. perforated) area 52, as shown e.g. in FIG. 3.

Casing 50 may further comprise a second major portion 53 that resides outwardly of the second major side 35 of the filter media and that includes a second air-permeable area 54 (noting that these items are not directly visible in FIG. 3). As noted, in many embodiments filter cartridge 1, and casing 50 thereof, may be symmetrical and reversible so that major casing portion 53 and features thereof, may correspond to the above-described major casing portion 51 and features thereof. In some embodiments, casing 50 may extend around filter media 10 so as to comprise at least some minor portions (e.g., sidewalls) that reside outwardly of, and occlude, at least some minor end faces of the filter media. In some embodiments casing 50 may extend around, and occlude, two minor end faces of the filter media with third and fourth ends of the filter media being occluded e.g. by hardened adhesive dams. In other embodiments casing 50 may extend around e.g. all six faces (two major faces and four minor end faces) of the filter media. Casing 50 may be provided by a single casing part, or by multiple casing parts acting in combination. Casing 50 may be attached to filter media 10 in any convenient way, e.g. by the use of adhesive. Casing 50 may be made of any suitable material, e.g. plastic, paperboard, or the like. In specific embodiments, casing 50 is made of paperboard. In various embodiments, the thickness of casing 50 may be in the range of 0.1 to 1.0 mm, or in the range of 0.2 to 0.8 mm, or in the range of 0.4 to 0.6 mm.

As noted, disposable filter cartridge 1 is installed within cartridge holder 60 for use in respirator 300. It will be appreciated that cartridge holder 60 is not a part of filter cartridge 1 (and vice versa) and filter cartridge 1 and cartridge holder 60 are not permanently attached to each other. Rather, cartridge holder 60 is configured to receive a filter cartridge 1 that is installed thereinto, and serves to fluidically connect the filter cartridge to a mask body over the usable lifetime of the filter cartridge, after which the filter cartridge is removed and replaced. An exemplary cartridge holder 60 is shown in side-front partially exploded perspective view in FIG. 3. In the illustrated embodiment cartridge holder 60 is conveniently formed of a shroud 64 that provides a front side 61 of the cartridge holder, and a base 65 that provides a rear side 62 of the cartridge holder (although any suitable design, relying on any number of parts, of cartridge holder 60 may be used). Cartridge holder 60 has an upper end 76 and a lower end 75 (which terms have their customary meaning) as indicated in FIG. 1.

As assembled, cartridge holder 60 may be at least substantially air-impermeable (i.e., having no substantially unoccluded openings thereinto) except for at least one unfiltered air inlet 63 located e.g. at a lower end 75 of cartridge holder 60, and at least one filtered air outlet 77 through which filtered air can exit cartridge holder 60 to reach mask body 310. It will be appreciated that locating an unfiltered air inlet 63 at the lower end of cartridge holder, so that it is frontally shielded by front side 61 of the cartridge holder (e.g., by an air-impermeable shroud 64), can advantageously shield the filter cartridge from splashes of liquid, from debris emitted by industrial processes (e.g. such as grinding), from sparks from welding, and so on. However, an unfiltered air inlet can be located at any desired position of cartridge holder 60; for example, an inlet might be located on a forward-facing surface of shroud 64 of cartridge holder 60, e.g. with a splash shield provided thereover. Alternatively, an unfiltered air inlet might be provided on a rearward location of cartridge holder 60 (e.g., on a rear face of base 65). In such a case, all descriptions herein in which a front face of a filter cartridge is referred to as an upstream face of the cartridge, and all descriptions herein in which a rear face of a filter cartridge is referred to as a downstream face of the cartridge, will be understood to be reversed.

In the illustrated embodiment of FIG. 3, shroud 64 is hingedly connected to base 65 in clamshell fashion, such that shroud 64 can be rotated about hinged connection 69 to base 65 to open cartridge holder 60 sufficiently that a (spent) filter cartridge 1 can be removed and a replacement filter cartridge 1 inserted. However, this is merely an exemplary embodiment and, for example, shroud 64 may be attachable and detachable from base 65 (e.g., by a snap-fit) rather than being hingedly connected thereto. If a shroud is hingedly connected to a base, the shroud may be a separately-made item, with the shroud and the base having complementary mating features that provide a hinged connection. In other embodiments, the shroud and the base may be made of the same material, and in some embodiments may be molded as one unit with a living hinge that provides a hinged connection between the two portions of the cartridge holder.

Whatever the specific design, cartridge holder 60 may comprise a first holder portion (e.g., a shroud) that is movable relative to a second holder portion (e.g. a base) between a first, open position in which a filter cartridge 1 can be installed into the cartridge holder, and a second, closed position in which the filter cartridge is securely held (sandwiched) within the cartridge holder. The holder portions (regardless of their number) may be conveniently made of e.g. molded thermoplastic polymer material (e.g. an injection-molding resin). In particular embodiments, a first and/or second holder portion may include one or more compressing structures that are configured to press a particular area of the filter cartridge against a receiving structure of the other holder portion, in order to hold the filter cartridge securely in place and to prevent any air leaks around the edges of the filter cartridge. If desired, one or more optional gaskets may be used to enhance the air-tightness of the fit of the filter cartridge within the cartridge holder.

If desired, one or more latches may be provided to ensure that the first and second holder portions are securely latched to each other when the portions are in their closed positions. Such latches may take any suitable form. In some embodiments, a 67 latch may be provided collectively by complementary mating features, a first one of which is e.g. integrally molded with the first portion 64 of the holder, a second of which is e.g. integrally molded with the second portion 65 of the holder. In an exemplary embodiment of this type, first holder portion 64 may comprise a deflectable tongue 74 that, when holder portions are closed together, fits into a slot 71 while being slightly deflected in the process so as to snap in place in the slot. A user of the respirator can the manually deflect tongue 74 so allow the cartridge holder to be opened. In some embodiments a disposable filter cartridge may be held sandwiched in place between the first holder portion and the second holder portion purely by the pressure exerted by the holder portions as described above. However, in other embodiments, one or more ancillary fasteners (e.g., latches, clasps, snaps, pincers, pins, and the like) may be used to enhance the holding of filter cartridge 1 in place. Similarly, any type of adhesive, hook and loop fastener, or the like may be used for such purpose.

FIG. 4 is a cross-sectional slice view (viewed from beneath, and slightly to the side of, the lower end 75 of a cartridge holder 60) that shows an exemplary arrangement of a disposable filter cartridge 1 installed within a cartridge holder 60. (A sealing platen is omitted from FIG. 4 for ease of depicting the below-described airflow path.) Unfiltered air enters the cartridge holder 60 through the previously-mentioned unfiltered air inlet 63 (not visible in FIG. 4). From there the air enters upstream plenum 66 (that is located forward of disposable filter cartridge 1) and then passes through the through-holes 55 of first air-permeable area 52 of filter cartridge casing 50 to enter filter cartridge 1 (thus exiting the upstream (unfiltered) air path of the respirator). The air then passes through the filter media 10 and is filtered thereby. The filtered air then exits the filter cartridge 1 through the through-holes of second air-permeable area 54 of second major portion 53 of casing 50 to reach downstream plenum 68 (that is located rearward of disposable filter cartridge 1) of the cartridge holder 60. The filtered air then flows through exit passage 77, which fluidly connects downstream plenum 68 of filter cartridge 1 to filtered air receiving interior 312 of mask body 310. (It will be appreciated that with a front-rear symmetric and reversible filter cartridge as described earlier, the filter cartridge can be front-rear flipped and would still function as described.) Downstream plenum 68, filtered-air exit passage 77, and interior 312 of mask body 310 thus collectively provide a downstream (filtered) air pathway.

Fit-Check Device

A cartridge holder 60 as disclosed herein includes a fit-check device for performing a negative-pressure fit-check of respirator 300. The ordinary artisan will recognize that a negative-pressure fit-check involves blocking the flow of air as a user inhales while wearing the respirator. In this manner a user can evaluate (e.g. by way of the force with which the mask body of the respirator is pulled against the user's face by suction) the quality of the fit of the mask body to the user's face.

In the arrangements disclosed herein, a fit-check device is included in cartridge holder 60. Such an arrangement is distinguished from designs in which a fit-check device is located e.g. in a mask body of a respirator. Furthermore, by definition a fit-check device as disclosed herein operates by interacting with the installed disposable filter cartridge itself (e.g., by way of at least a portion of a sealing platen of the fit-check device being brought into direct contact with a major face of the disposable filter cartridge to block any airflow therethrough). Such an arrangement is distinguished from e.g. a fit-check device that operates by closing a valve that is independent of the presence or absence of a disposable filter cartridge (for example, a valve that is located remotely upstream (or downstream) from the filter cartridge and that operates by way of components solely present in a cartridge holder and/or a mask body and not by way of any interaction with the disposable filter cartridge itself.) One example of a valve that operates independently of any disposable filter cartridge would be a valve that is located on an unfiltered air inlet of a filter cartridge, e.g. a valve of the type disclosed in JP Patent 2002126111.

It will be appreciated that arrangements disclosed herein, in which a fit-check device operates by interacting with a disposable filter cartridge itself, can advantageously provide that a fit-check procedure may allow the evaluation of not only the quality of the fit of a mask body to the user's face, but may also enhance the ability of the user to confirm that the disposable filter cartridge is properly installed in the cartridge holder (e.g., without there being any air leaks around the edges of the filter cartridge).

In specific embodiments, a fit-check device as disclosed herein can operate in the air pathway immediately upstream of the disposable filter cartridge (e.g. in the upstream plenum). For example, such a fit-check device may operate e.g. by way of a sealing platen that seals against an upstream face of the disposable filter cartridge and will not operate in, or in fact even be in contact with, any portion of the downstream air pathway of the respirator. The ordinary artisan will appreciate that such an arrangement can advantageously minimize any possibility that the fit-check device itself might provide an airleak pathway by which unfiltered air might enter the filtered air-receiving interior of the mask body of the respirator.

In some embodiments, an air-permeable area 52 of a major front surface 59 of a disposable filter cartridge 1 will be provided by way of a plurality of through-holes (e.g., perforations) 55 in a casing 50 of the disposable filter cartridge (as seen most easily in FIG. 3). In general, the sealing function of the fit-check device can be achieved by individually sealing (occluding) each individual through-hole of the filter cartridge casing with a locally air-impermeable area of the sealing platen; and/or, by blocking the air pathway to all such through-holes by sealing at least around the perimeter of the perforated area of the filter cartridge casing. Both of these approaches are discussed in detail below. Furthermore, the actuation (moving) of a sealing platen to the sealing position may be performed e.g. by translationally moving the sealing platen in a direction normal to the major front surface of the disposable filter cartridge, or, by pivotally moving the sealing platen so that at least one end of the sealing platen moves in a direction that is (locally) normal to the major front surface of the disposable filter cartridge, or by slidably moving the sealing platen in a direction parallel to the major front surface of the disposable filter cartridge. All of these general approaches and variations thereof are described in detail below.

Figure 7:
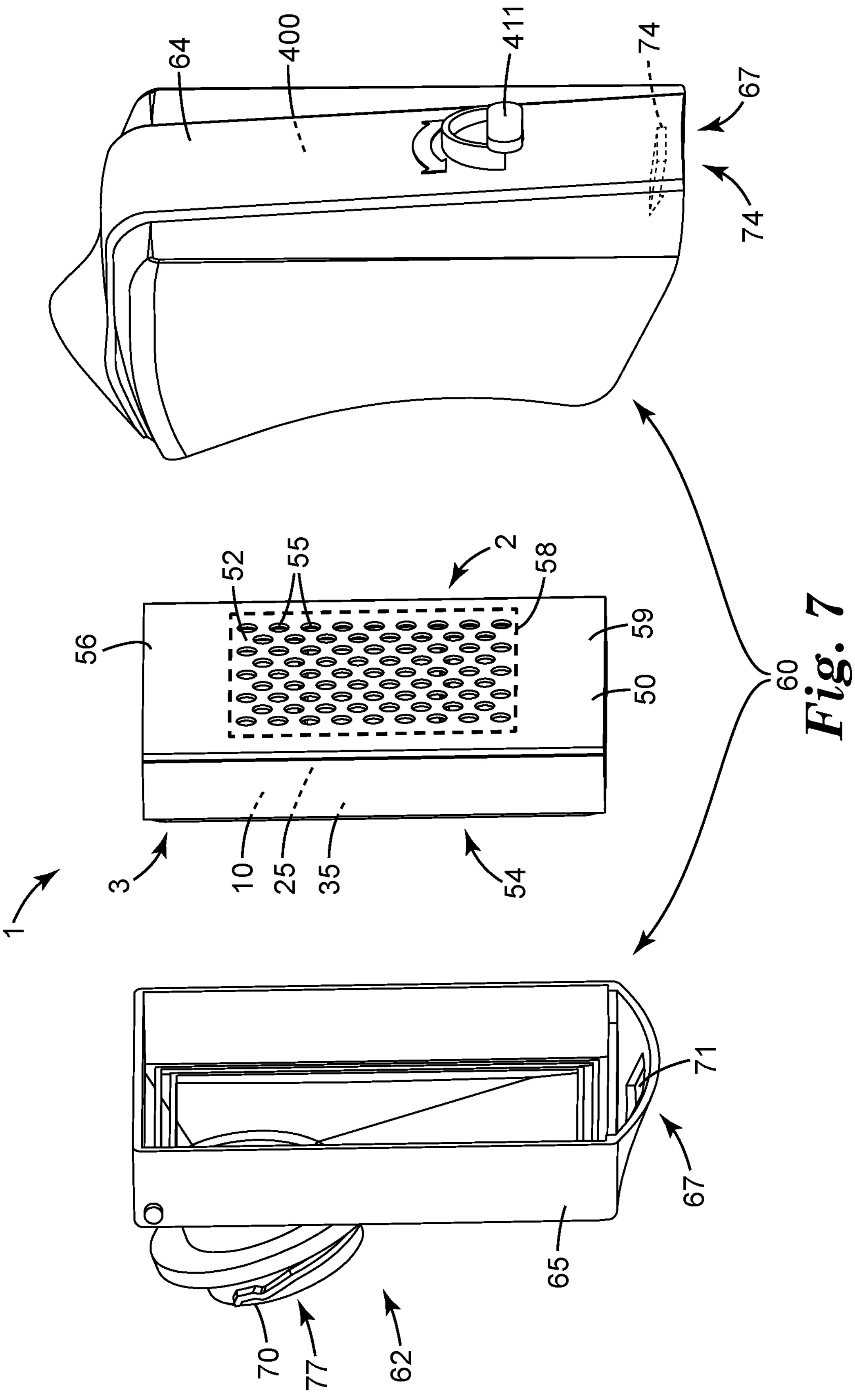
FIG. 7 is a side-front partially exploded perspective view of another exemplary cartridge holder and an exemplary disposable filter cartridge.
Figure 8A:
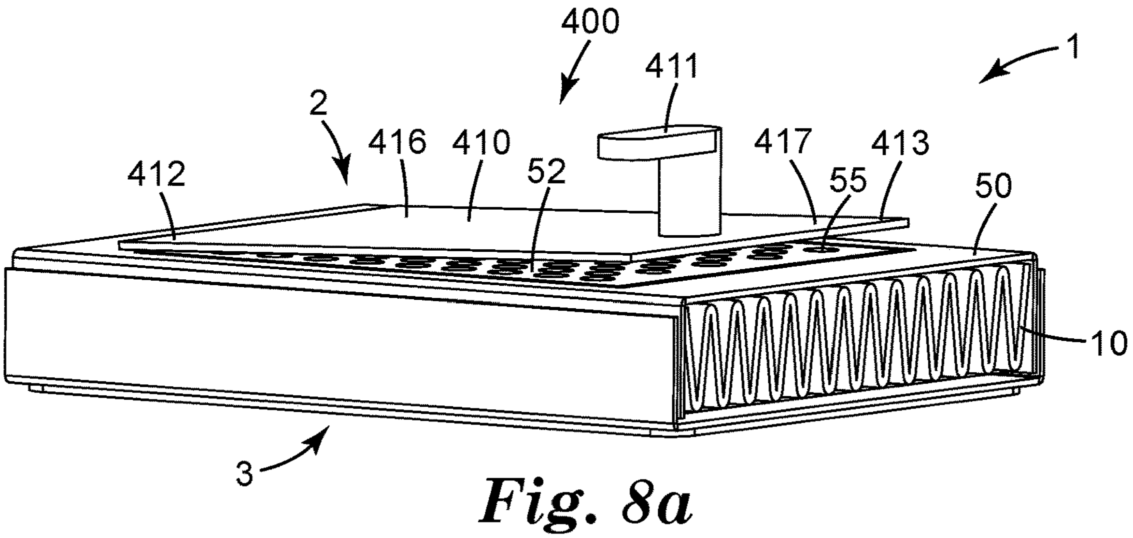
FIG. 8*a* is a side-front perspective isolated view of another exemplary sealing platen shown in a first, unsealed position relative to an exemplary disposable filter cartridge.
Figure 8B:
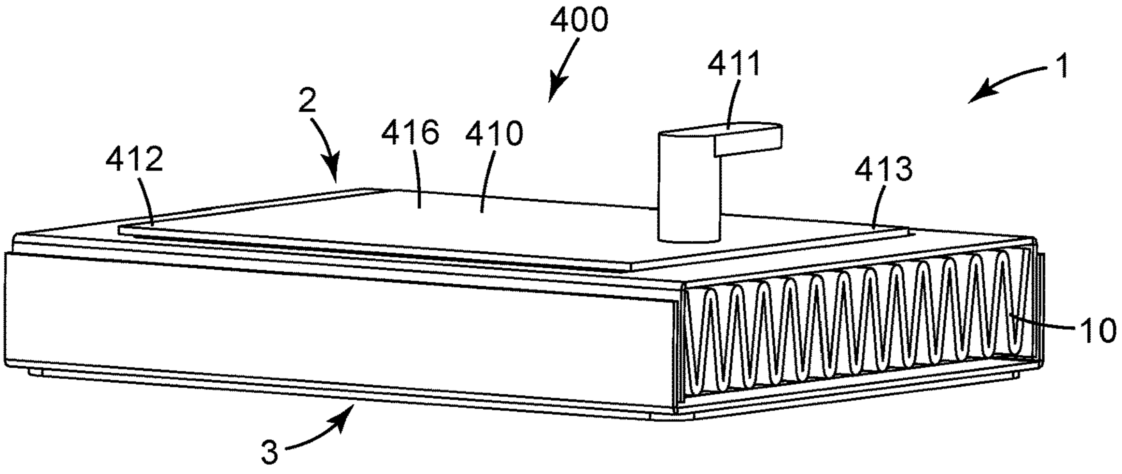
FIG. 8*b* is a side-front perspective isolated view of another exemplary sealing platen shown in a second, sealed position relative to an exemplary disposable filter cartridge.
Figure 9:
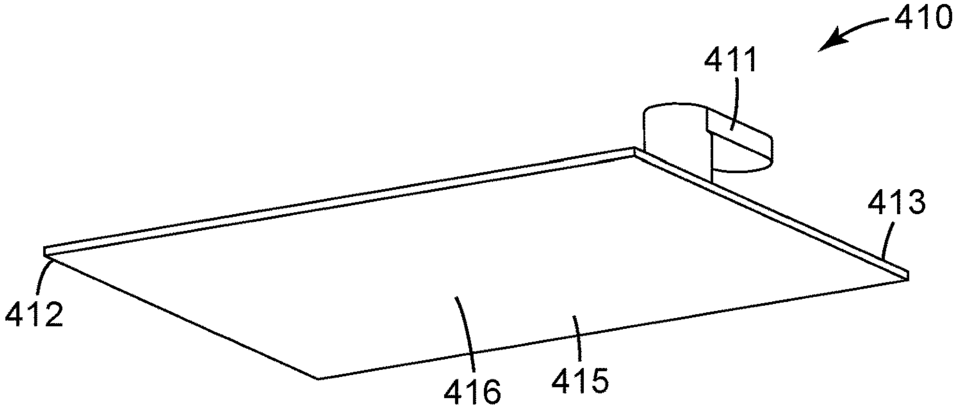
FIG. 9 is a side-rear perspective isolated view of the exemplary sealing platen of FIGS. 8*a* and 8*b*.

In embodiments of the general type shown in FIGS. 7, 8*a*-8*b*, and 9, a fit-check device 400 may comprise a sealing platen 410 with a major rear surface 415 (most easily seen in FIG. 9). (In FIGS. 8*a* and 8*b* the other components of cartridge holder 60 are omitted so that the structure and functioning of sealing platen 410 can be more clearly presented.) Sealing platen 410 includes a major area 416 over which rear surface 415 may be at least substantially planer. Major area 416 that is a continuously imperforate area (meaning that, within the perimeter of major area 416, no part of area 416 is interrupted by any through-holes). A first end of sealing platen 410 is connected to cartridge holder 60 (in this embodiment, to shroud 64) by a pivotal connection 412 (which might be e.g. a hinge, a living hinge, or the like). When sealing platen 410 is in a first, unsealed position (as in FIG. 8*a*), end 413 of sealing platen 410 that is distal to the pivotal connection, is spaced forwardly from major front surface 59 of filter cartridge 1, to allow airflow into the space therebetween. (Platen 410 may be conveniently oriented so that end 413 is located proximate unfiltered air inlet 63 of holder 60.)

Sealing platen 410 may be manually actuated (moved) into a second, sealed position as shown in FIG. 8*b*, in which end 413 of platen 410 is pivotally moved toward, and into contact with, major front surface 59 of filter cartridge 1. This causes rear surface 415 of sealing platen 410, over at least substantially the entirety of major area 416 of sealing platen 410, to come into direct contact with major front surface 59 of filter cartridge over at least substantially the entirety of major area 52 of the filter cartridge. In this manner, all of the through-holes 55 of the plurality of through-holes of air-permeable area 52 of major front surface 59 of the filter cartridge are each individually sealed (occluded) by local areas of the continuously imperforate area 416 of the sealing platen. (By way of a specific example, when the sealing platen is in the second, sealed position, the specific through-hole labeled 55 in FIG. 8*a* will be individually occluded by the local area of sealing platen 410 labeled 417.)

It will be appreciated that in order for appropriate sealing to be achieved with a sealing platen that exhibits a planar (contact) surface 415 (as in the exemplary sealing platen depicted in FIG. 9), the fit-check device may be configured so that the end of the platen with that is pivotally connected to the cartridge holder may be locally in very close proximity to (e.g., in direct contact with) the major front surface of the filter cartridge, to provide that when the platen is pivotally moved into the second, sealed position, at least substantially the entire area 416 of the rear surface 415 of the platen is brought into direct contact with the front face of air-permeable area 52 of the filter cartridge. Various parameters, e.g. the angle at which the sealing platen resides relative to the front-facing major surface of the filter cartridge when the sealing platen is in the first, unsealed position, may be selected so that adequate flow of unfiltered air is allowed through the gap between the major front surface of the filter cartridge and the rear surface of the sealing platen, when the platen is in the first, unsealed condition (that is, when the respirator is in ordinary breathing use rather than being fit-checked). In such embodiments, it will be appreciated that moving the sealing platen to the second, sealed position will involve moving the end of the platen that is distal to the pivotal connection of the platen to the cartridge holder, rearward toward the filter cartridge along a (slightly arcuate) path that is locally normal to the major front surface of the disposable filter cartridge.

It will be appreciated that although in the exemplary embodiments of FIGS. 7, 8*a*-8*b*, and 9 sealing platen 410 is pivotally connected to a cartridge holder so that the platen can be moved pivotally rearwardly toward the second, sealed position, in other embodiments a sealing platen can be configured so that the sealing platen can be moved rearward by translational movement (rather than by pivotal movement) to put the platen into the second, sealed position. In such a design, neither end of the sealing platen would be pivotally connected to the cartridge holder but rather the entirety of the sealing platen would be free to translationally move (e.g. slide) toward the disposable filter cartridge, along a direction that is at least substantially normal to the major front surface of the disposable filter cartridge. Such an arrangement will allow the same general type of sealing to be performed as described above (with each individual through-hole of the filter cartridge casing being individually occluded by a local area of the sealing platen), but may allow that a greater overall air gap between the major rear surface of the sealing platen and the major front surface of the filter cartridge may be allowed when the platen is in the first, unsealed position.

In the illustrated embodiment of FIGS. 7, 8*a*-8*b*, and 9, sealing platen 410 is actuated by way of a member (e.g., handle) 411 that can be rotated in one direction to actuate platen 410 into the second, sealed position, and can be rotated in a rotationally opposite direction to actuate platen 410 back into the first, unsealed position. (Handle 411 may comprise e.g. a cam that is configured to motivate sealing platen 411 as the handle is turned.) It will be appreciated that such a handle could alternatively be slidably moved back and forth e.g. generally along the major plane of shroud 64, could be moved frontward-rearward relative to shroud 64, and so on.

In embodiments of the general type shown in FIGS. 3, 5*a*-5*b*, and 6, a fit-check device 200 may rely on a sealing platen 210 that comprises a sealing flange 218. Sealing flange 218 completely encompasses (surrounds) an air-impermeable area 216 of platen 210 that is a continuously imperforate area as defined above. Sealing flange 218 extends (protrudes) at least generally rearwardly from the main body of sealing platen 210, and includes a rear contact surface 219 (most easily seen in FIG. 3) that provides a rear contact surface 215 of platen 210. A first end of sealing platen 210 is connected to cartridge holder 60 (in this embodiment, to shroud 64 thereof) by a pivotal connection 212. When sealing platen 210 is in a first, unsealed position, end 213 of sealing platen 210 that is distal to the pivotal connection, is spaced forwardly from major front surface 59 of filter cartridge 1, to allow airflow into the space therebetween.

Sealing platen 210 thus operates in somewhat similar manner to the above-described sealing platen 410. One difference is that when sealing platen 210 is actuated into a second, sealed position (by pivotally moving end 213 of platen 210 toward the major front surface 59 of filter cartridge 1), the entirety of air-impermeable area 216 of sealing platen 210 does not come into contact with air-permeable area 52 of the filter cartridge. Rather, the rear contact surface 219 of sealing flange 218 comes into contact with perimeter 58 of air-permeable area 52 of the filter cartridge. In other words, rather than a rear surface of e.g. much or most of the sealing platen coming into contact with the entirety of the area 52 circumscribed by dotted line 58 in FIG. 3 (as would be the case for the previously-described style of sealing platen), only the rear surface 219 of sealing flange 218 will contact the major front surface of the filter cartridge, and only in the locations of the filter cartridge major front surface indicated by dotted line 58 itself. It will be appreciated that in such embodiments the sealing is achieved by blocking off airflow (by way of continuously imperforate area 216 of the sealing platen, and sealing flange 218 of the sealing platen, acting in combination) from reaching the through-holes of the filter cartridge casing, rather than by individually sealing each of the through-holes.

Sealing platen 210 as depicted also differs from sealing platen 410 in the manner of actuation. In the exemplary designs of FIGS. 3, 5*a*-5*b*, and 6, the front surface of platen 210 itself serves as the actuator. That is, to actuate platen 210 from a first, unsealed position into a second, sealed position, the user exerts manual rearward pressure (e.g. with one or more fingertips) to pivotally move the distal end of platen 210 rearward, rather than e.g. turning a handle. In such embodiments, platen 210 may be maintained in the second, sealed position by way of continued manual rearward pressure by the wearer, with e.g. a biasing member (e.g. a spring) 214 being provided that will return platen 210 to the first, unsealed position in the absence of continued rearward pressure on platen 210. In alternative embodiments, a latch, (e.g., a so-called touch latch, which will be familiar to the ordinary artisan) may be provided so that a first rearward actuation (e.g., a rearward push on the platen) causes platen 210 to be moved to the second, sealed position and held there even if the rearward actuation pressure ceases. A second, subsequent rearward actuation (e.g., a second rearward push on the platen) can then cause platen 210 to be released, at which point it can be motivated (e.g. by a biasing member) forwardly back to the first, unsealed position.

Another difference between fit-check device 200 of FIGS. 3, 5*a*-5*b*, and 6 and fit-check device 400 of FIGS. 7, 8*a*-8*b*, and 9, is that the sealing platen 410 of fit-check device 400 is positioned rearwardly behind the major front surface of cartridge holder 60 and thus is not visible in the view of FIG. 7. (Actuating member 411 of fit-check device 400 may thus pass through an aperture in the major front surface of cartridge holder 60 in order to reach platen 410.) In contrast, sealing platen 210 of fit-check device 200 is provided as part of shroud 64 of cartridge holder 60, with a major front surface 211 of sealing platen 210 providing a major front surface of shroud 64 as is evident from inspection of FIGS. 3 and 5*a*-5*b*. Either of these approaches may be used with a sealing platen that has a planar rear contact surface (as in platen 410) or with a sealing platen that comprises a rearwardly extending sealing flange (as in platen 210).

It will be appreciated that a sealing flange as disclosed herein, particularly if used in combination with a filter cartridge that includes a casing that is relatively compliant (e.g. that is made of paperboard as described herein), may advantageously allow a relatively low sealing force to be used in placing/maintaining the sealing platen in the second, sealed position. It will also be appreciated that a sealing platen of the type depicted in FIG. 6 (with a sealing flange) may be actuated by being translationally moved rather than being pivotally moved, in similar manner as described earlier herein.

Figure 10:
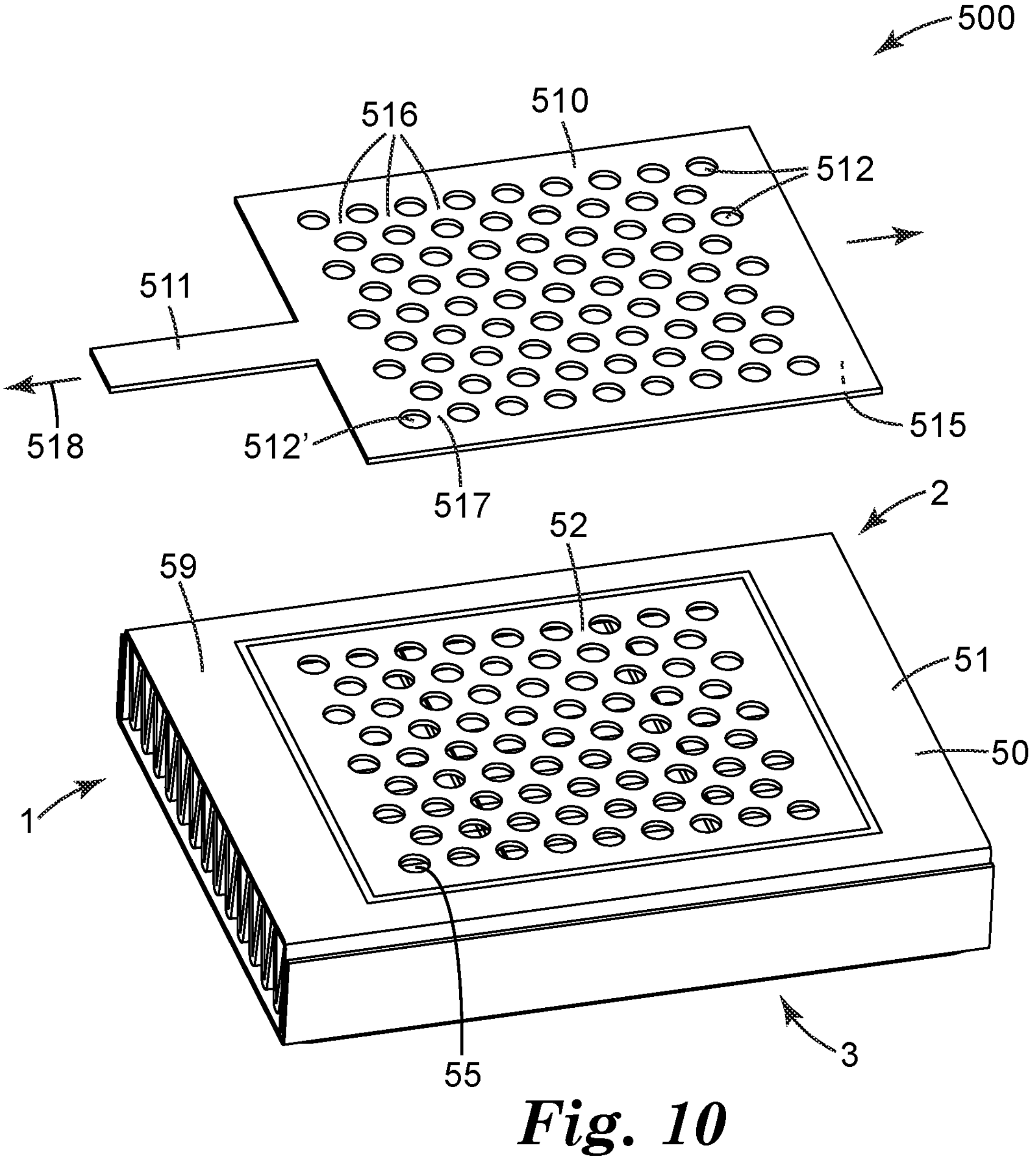
FIG. 10 is a side-front perspective exploded isolated view of another exemplary sealing platen and an exemplary disposable filter cartridge.

Another approach to performing a fit-check is depicted in exemplary embodiment in FIG. 10. In a fit-check device 500 of this general type, the sealing platen 510 is slidably movable relative to the major front surface 59 of the disposable filter cartridge 1 in a direction that is at least substantially parallel to the major front surface 59 of the disposable filter cartridge (e.g., in a direction indicated by the arrows in FIG. 10). The first air-permeable area 52 of the major front surface 59 of the disposable filter cartridge 1 comprises a plurality of through-holes 55 that are arranged in a pattern. The air-impermeable area 516 of the sealing platen is a discontinuous area that is interrupted by through-holes 512 that are arranged in an at least partially overlapping pattern relative to through-holes 55 of the major front surface of the disposable filter cartridge. Also, at least a substantial portion of rear surface 515 of sealing platen 510 is in overlapping relation with, and is in contact with, at least a substantial portion of air-permeable area 52 of major front surface of the disposable filter cartridge (noting that in the partially exploded view of FIG. 10, sealing platen 510 is shown exploded away from filter cartridge 1; however, in the cartridge holder as assembled with a filter cartridge installed therein, rear surface 515 of platen 510 will be in direct contact with major front surface 59 of air-permeable area 52 of filter cartridge 1).

With such arrangements, sealing platen 510 is slidably movable relative to major front surface 59 of disposable filter cartridge 1 between a first, unsealed position in which at least some of the through-holes 512 of sealing platen 510 at least partially overlap at least some of the through-holes 55 of area 52 of the major front surface 59 of filter cartridge 1 so as to allow flow of unfiltered air into filter cartridge 1; and, a second, sealed position in which none of the through-holes 512 of sealing platen 510 overlap any portion of any of the through-holes 55 of area 52 of the major front surface 59 of filter cartridge 1. In other words, when sealing platen 510 is in the second, sealed position all of the through-holes 55 of area 52 of the major front surface 59 of filter cartridge 1 are individually occluded by local areas of the discontinuous air-impermeable area 516 of the sealing platen. By way of specific example, when platen 510 is in the first, unsealed position at least a portion of the specific through-hole labeled 512' of platen 510 will be in overlapping relation with the specific through-hole labeled 55 of the filter cartridge holder. If platen 510 is moved in the direction indicated by the arrow labeled 518 in FIG. 10 to actuate the platen to the second, sealed position, through-hole 55 may now be individually occluded by locally air-impermeable area 517 of discontinuous air-impermeable area 516 of platen 510.

The ordinary artisan will easily appreciate the difference between the discontinuous air-impermeable area 516 of platen 510 (which discontinuous air-impermeable area is interrupted by through-holes), and the continuously imperforate (air-impermeable) area 416 of platen 410 described earlier herein. Also, it will be noted that the concept of the through-holes of a sealing platen being in an at least partially overlapping pattern relative to the through-holes of a filter cartridge does not mean that the center-to-center distance and direction of the through-holes of the sealing platen must be exactly the same as that of the through-holes of the filter cartridge. Nor must every through-hole of the filter cartridge have exactly one corresponding through-hole of the sealing platen (in fact, the same number of holes need not be present). All that is needed is that the through-holes of the sealing platen are arranged in a pattern such that the sealing platen can be placed in at least one position in which at least some portion of at least some through-holes of the filter cartridge are not blocked by a locally air-impermeable area of the platen; and, such that the sealing platen can be slidably moved to at least one other position in which all portions of all through-holes of the filter cartridge are now blocked by locally air-impermeable areas of the sealing platen. In other words, the first, unsealed position does not require perfect overlap of the through-holes of the platen with the through-holes of the filter cartridge. However, in some specific embodiments the through-holes of the platen may be arranged to have the same center-to-center distance and direction as the through-holes of the filter cartridge.

It will also be appreciated that in embodiments of the general type depicted in FIG. 10, at least a substantial portion of rear surface 515 of sealing platen 510 will be in contact with at least a substantial portion of air-permeable area 52 of major front surface of the disposable filter cartridge, even when the sealing platen is in the first, unsealed position. This is in contrast to embodiments of the general type discussed earlier herein, in which at least a substantial portion of a rear surface of a sealing platen will be spaced apart from the major front surface of the disposable filter cartridge when the sealing platen is in the first, unsealed position.

In the depicted embodiment of FIG. 10, sealing platen 510 may be slidably moved by way of actuator 511. The ordinary artisan will appreciate that any suitable type of actuator, arranged as desired, may be used. For example, such an actuator might comprise a rod that extends e.g. outward through an aperture provided in an upstream holder component (e.g., a shroud) of a cartridge holder. It will further be appreciated that although the specific exemplary embodiment of FIG. 10 depicts a sealing platen that can be (slidably) translatably moved, the arrangements disclosed herein also encompass designs in which a sealing platen might be (slidably) rotatably moved so as to bring through-holes in the sealing platen in and out of (at least partial) alignment with through-holes in a filter cartridge that is installed in the cartridge holder. Whatever the specific approach, it will be appreciated that the cartridge holder and the filter cartridge can be advantageously designed so that when the filter cartridge is installed in the cartridge holder, any through-holes in the filter cartridge casing are automatically registered relative to through-holes in the sealing platen, so that the sealing platen can be moved between a first, unsealed position and a second, sealed position in the general manner disclosed herein.

In summary, various arrangements have been presented herein by which a filter cartridge can be sealed to perform a negative-pressure fit-check of a respirator. It will be appreciated that many of these approaches have the common theme that a sealing platen is located immediately upstream of a filter cartridge (e.g., in an upstream plenum of the airflow path), and is configured so that at least a portion of a surface (e.g., a rear surface) of the sealing platen can be brought into contact with at least a portion of an air-permeable area of a major upstream surface (e.g., a major front surface) of the filter cartridge, to perform the desired sealing. (In other embodiments, the sealing may be performed by bringing a downstream surface of a sealing platen against a major downstream surface of a filter cartridge, and/or by bringing a major front surface of a sealing platen against a major rear surface of a filter cartridge, if desired.) It is emphasized that in filter cartridges in which an unfiltered air inlet is provided on a rearward side of the filter cartridge (as in, for example, the arrangements disclosed in U.S. Provisional Patent Application No. 62/186,566, referred to in detail later herein), the upstream air plenum will be on the rear side of the filter cartridge, and the downstream air plenum will be on the front side of the filter cartridge. Accordingly, all descriptions herein in which e.g. a rear surface of a sealing platen is described as being contacted with a front surface of a filter cartridge in order to seal the upstream face of the filter cartridge, will be understood to be reversed. All other aspects, features and components described herein will still be applicable in such designs, however.

Shown in FIG. 1 in side-front partially exploded perspective view is an exemplary respirator 300 that comprises a cartridge holder 60 (shown disengaged from mask body 310). In the illustrated embodiment exemplary respirator 300 is a half mask respirator that may be worn by a user to cover the nose and mouth and to define an interior air space 312. However, a filter cartridge 1 and cartridge holder 60 as disclosed herein may be used with any type of respirator, including e.g. a full mask respirator, a powered air respirator, and so on. In some embodiments, mask body 310 may include one or more at least semi-rigid portions and a resilient face-contacting portion. An exhalation valve 311 may be provided to allow exhaled air to be discharged from an interior air space. Respirator 300 may also include a harness assembly (not shown) that is able to support the respirator as mounted to a user's face.

A cartridge holder 60 may be connected to a mask body 310 in any desired manner. For example, as depicted in FIGS. 1 and 2, mask body 310 may include one or more fittings 340 configured to mate with a complementary fitting 70 of a cartridge holder 60. Such fittings may cooperate to provide (e.g., to circumscribe) an airflow pathway from cartridge holder 60 to filtered air-receiving interior 312 of mask body 310. In other arrangements, an airflow pathway may be provided independently of a fitting or fittings that are used to secure a cartridge holder to a mask body. For example, an airflow pathway might be provide e.g. by a sleeve that mates with an orifice, while a separate set of fittings/fasteners might be the primary mechanism by which the cartridge and mask body are held together.

Filter media 10 may be made from any suitable media, e.g. pleatable media. Potentially suitable materials may include e.g. paper; porous films of thermoplastic or thermoset materials; nonwoven, such as melt blown or spunbond, webs of synthetic or natural fibers; scrims; woven or knitted materials; foams; electret or electrostatically charged materials; fiberglass media; or laminates or composites of two or more materials. A nonwoven polymeric web comprised of polyethylene, polypropylene or poly(lactic acid) may be suitable, for example. Any suitable method of making a nonwoven web (e.g., melt-blowing, melt-spinning, carding, and so on) may be used. Filter media 10 may also include sorbents, catalysts, and/or activated carbon (granules, fibers, fabric, and molded shapes).

Multilayer media, e.g. laminated media, can also be used as filter media 10. Such media may consist of laminated layers of the media discussed above or of other substrates laminated to one or more layers of filter media, for example. In some embodiments, a prefilter layer may be used on the upstream side of filter media 10. Such a prefilter layer may comprise e.g. polypropylene, polyethylene, polyethylene terephthalate, poly(lactic acid), or blends of these materials; or it may comprise fiberglass. In other words, in some embodiments filter media 10 may comprise a base (e.g., filtration) layer, along with any other layer or layers as desired for any purpose. For example, a highly open plastic netting or mesh might be laminated to the media, in order to e.g. enhance the abrasion resistance of the media. Any such layer may be bonded to e.g. a base (e.g. filtration) layer by any suitable method, e.g. by melt-bonding, by way of an adhesive (hot melt adhesive, pressure-sensitive adhesive, and so on), calendering, ultrasonic bonding, etc.

In specific embodiments, filter media 10 may be an electret material, comprised of e.g. any charged material, e.g. split fibrillated charged fibers as described in U.S. Pat. RE 30782. Such charged fibers can be formed into a nonwoven web by conventional means and optionally joined to a scrim such as disclosed in U.S. Pat. No. 5,230,800 forming an outer support layer. In other specific embodiments, filter media 10 can be a melt blown microfiber nonwoven web, e.g. such as disclosed in U.S. Pat. No. 4,813,948, which can optionally be joined to a secondary layer during web formation as disclosed in that patent, or subsequently joined to a secondary web in any conventional manner. Filter media that may be particularly suitable for certain applications might include e.g. media of the general type described in U.S. Pat. No. 8,162,153 to Fox; media of the general type described in U.S. Patent Application Publication 20080038976 to Berrigan; and, media of the general type described in U.S. Patent Application Publication 20040011204 to Both, and media generally known as tribocharged media. Any such media can be charged to form an electret, if desired. The filter media may be configured to filter (e.g., capture) particles, vapors, or gases, or any combination thereof.

Various filter cartridges and filter media thereof that may be suitable for use in the present application are described in further detail in U.S. Provisional Patent Application No. 62/186,566, filed 30 Jun. 2015, entitled FILTER CARTRIDGE COMPRISING FILTER MEDIA WITH ADHESIVELY EDGE-SEALED ENDS, AND METHOD OF MAKING AND USING. The ’566 application is incorporated by reference in its entirety herein (noting that the permanent edge-sealing of a filter media, e.g. with an adhesive dam, as described in the ’566 application is distinguished from the temporary sealing of a disposable filter cartridge in order to perform a fit-check that is described in the present application).

In some embodiments, filter media 10 is a pleated filter media. In particular embodiments, filter media is a pleated filter media that includes edge seals of hardened adhesive at first and second (corrugated) ends of the pleated media, as described in detail in the ’566 application. In some embodiments in which the filter media is not pleated, the filter media may be a porous block (e.g. a monolith, e.g. of activated carbon or the like), e.g. wrapped in a casing with first and second air-permeable (e.g. perforated) major surfaces in similar manner to that described above.

In some embodiments, filter cartridge 1 may be the only filtering component that resides within cartridge holder 60. However, in other embodiments, one or more layers of material may reside within cartridge holder 60 (e.g., in overlapping relation to, e.g. butted up against a major surface of, filter cartridge 1) for some additional purpose. Such a layer or layers may contain one or more materials that interact with a gaseous fluid (e.g. an airstream) to at least partially remove one or more components (e.g., gases, vapors, solid particles, aerosols, and so on) therefrom. The components in the fluid may be e.g. sorbed onto or into an active sorbent, may be reacted with a reactive ingredient, may be exposed to a catalyst, and so on. Potentially suitable materials for such uses include e.g., activated carbon; alumina and other metal oxides; sodium bicarbonate; metal particles (e.g., silver particles) that can remove a component from a fluid by adsorption, chemical reaction, or amalgamation; catalytic agents such as hopcalite and/or gold (which can catalyze the oxidation of carbon monoxide); clay and other minerals treated with acidic solutions such as acetic acid or alkaline solutions such as aqueous sodium hydroxide; ion exchange resins; molecular sieves and other zeolites; silica; biocides; fungicides and virucides. Mixtures of any such materials can be employed. In other embodiments, such materials may be provided as particles in a particle-loaded web layer. Combinations of any of these approaches may be used. If desired, such materials may be treated e.g. with one or more impregnants to enhance gas removal capability. Examples of treated materials include chemically surface-treated activated carbon.

Although terminology has been used herein in which a shroud of a cartridge holder is described as movable relative to a base of the cartridge holder, it will be understood that such terminology encompasses all variations such as moving the base relative to the shroud, and moving the base and shroud relative to each other. In some embodiments, at least a portion of a cartridge holder 60 may be sufficiently transparent to allow a user to determine that a filter cartridge 1 has been properly fitted within the holder. To facilitate the uses disclosed herein, a kit (e.g., a refill kit with instructions) may be provided that includes a plurality of filter cartridges, e.g. along with at least one cartridge holder if desired. In some embodiments a respirator 300 may include only a single cartridge holder and filter cartridge, which may be located symmetrically or asymmetrically with respect to the respirator body. In the illustrated embodiment, exemplary respirator 300 is a single-cartridge, half mask respirator. However, a cartridge holder and filter cartridge as disclosed herein may be used with any type of respirator, including e.g. a full mask respirator, a powered air respirator, and so on. Furthermore, two cartridge holders and corresponding filter cartridges as disclosed herein may be used with respirators that accept two such holders and cartridges.

LIST OF EXEMPLARY EMBODIMENTS

Embodiment 1 is a cartridge holder that is configured to be fluidically connected to a mask body of a respirator and that is configured to securely hold a disposable filter cartridge within the cartridge holder, the cartridge holder including: a fit-check device comprising a sealing platen that is operatively connected to an actuator by which a user of the respirator can manually actuate the sealing platen back and forth between: a first, unsealed position in which airflow is permitted through a disposable filter cartridge that is held within the cartridge holder; and, a second, sealed position in which a rear surface of at least a portion of an air-impermeable area of the sealing platen directly contacts at least a perimeter of a first air-permeable area of a major front surface of the disposable filter cartridge; or, in which a front surface of at least a portion of an air-impermeable area of the sealing platen directly contacts at least a perimeter of a second air-permeable area of a major rear surface of the disposable filter cartridge, so as to seal the first air-permeable area of the major front surface of the disposable filter cartridge or to seal the second air-permeable area of the major rear surface of the disposable filter cartridge, to prevent airflow through the disposable filter cartridge.

Embodiment 2 is the cartridge holder of embodiment 1, wherein when the sealing platen is in the second, sealed position, a rear surface of at least a portion of an air-impermeable area of the sealing platen directly contacts at least a perimeter of a first air-permeable area of a major front surface of the disposable filter cartridge so as to seal the first air-permeable area of the major front surface of the disposable filter cartridge so as to prevent flow of unfiltered air into the disposable filter cartridge. Embodiment 3 is the cartridge holder of embodiment 2 wherein the first air-permeable area of the major front surface of the disposable filter cartridge comprises a plurality of through-holes, wherein the air-impermeable area of the sealing platen is a continuously imperforate area, and wherein when the sealing platen is in the second, sealed position, all of the through-holes of the plurality of through-holes of the first major surface of the disposable filter cartridge are individually occluded by local areas of the continuously imperforate area of the sealing platen. Embodiment 4 is the cartridge holder of embodiment 3 wherein a first end of the sealing platen is pivotally connected to the filter cartridge holder by a pivotal connection and wherein the sealing platen is movable between a first, unsealed position in which at least a second end of the sealing platen that is distal to the pivotal connection is spaced forwardly away from the major front surface of the disposable filter cartridge, and a second, sealed position in which a rear surface of at least the second end of the sealing platen is in direct contact with a portion of the major front surface of the disposable filter cartridge.

Embodiment 5 is the cartridge holder of any of embodiments 2-3 wherein: the first air-permeable area of the major front surface of the disposable filter cartridge comprises a plurality of through-holes that are arranged in a pattern; the air-impermeable area of the sealing platen is a discontinuous air-impermeable area that is interrupted by through-holes that are arranged in a pattern that, when the sealing platen is in a first, unsealed position, at least partially overlaps the through-holes of the major front surface of the disposable filter cartridge; at least a substantial portion of a rear surface of the sealing platen is in overlapping relation with, and is in contact with, at least a substantial portion of the first air-permeable area of the major front surface of the disposable filter cartridge; and, the sealing platen is slidably movable relative to the major front surface of the disposable filter cartridge in a direction that is at least substantially parallel to the major front surface of the disposable filter cartridge, between a first, unsealed position in which at least some portion of at least some of the through-holes of the sealing platen at least partially overlap at least some of the through-holes of the major front surface of the disposable filter cartridge so as to allow flow of unfiltered air into the disposable filter cartridge, and a second, sealed position in which no portion of any of the through-holes of the sealing platen overlap any portion of any of the through-holes of the major front surface of the disposable filter cartridge, in which second, sealed position all of the through-holes of the plurality of through-holes of the major front surface of the disposable filter cartridge are individually occluded by local areas of the discontinuous air-impermeable area of the sealing platen.

Embodiment 6 is the cartridge holder of embodiment 2 wherein the air-impermeable area of the sealing platen is a continuously imperforate area and wherein the sealing platen comprises a sealing flange that extends completely around a perimeter of the continuously imperforate air-impermeable area of the sealing platen and that extends generally rearward therefrom and that has a rearward surface; and, wherein when the sealing platen is in the second, sealed position the entirety of the rearward surface of the sealing flange is in direct contact with the perimeter of the air-permeable area of the first, forward-facing major surface of the disposable filter cartridge. Embodiment 7 is the cartridge holder of any of embodiments 2-4, wherein the actuator comprises a major front surface of the sealing platen, which major front surface can be manually pushed rearward to actuate the sealing platen at least into the second, sealed position.

Embodiment 8 is the cartridge holder of any of embodiments 2-7, wherein the actuator comprises a movable handle that can be moved to actuate the sealing platen at least into the second, sealed position. Embodiment 9 is the cartridge holder of any of embodiments 2-8, wherein the sealing platen and/or the actuator is biased toward the first, unsealed position so that the sealing platen will return from the second, sealed position to the first, unsealed position unless continued manual actuation pressure on the actuator is maintained by a user. Embodiment 10 is the cartridge holder of any of embodiments 2-8, wherein the sealing platen, once actuated by a first manual actuation step into the second, sealed position, will remain in the second, sealed position without continued manual actuation pressure on the actuator by a user, and wherein a second manual actuation step is necessary in order to actuate the sealing platen from the second, sealed position to the first, unsealed position.

Embodiment 11 is the cartridge holder of any of embodiments 1-10, wherein the cartridge holder comprises a shroud that provides a major front face of the cartridge holder and a base that provides a major rear face of the cartridge holder; and, wherein the shroud is movable relative to the base portion between a first, open position in which a disposable filter cartridge can be installed into the holder, and a second, closed position in which the shroud and the base securely hold an installed disposable filter cartridge within the cartridge holder. Embodiment 12 is the cartridge holder of embodiment 11 wherein the shroud comprises a first complementary mating feature, and wherein the base comprises a second complementary mating feature that is complementary to the first complementary mating feature of the shroud, and wherein the first and second complementary mating features collectively provide a latch that, when the shroud portion is in the second, closed position, holds the shroud in the closed position and causes the shroud and base to exert a compressive force against the first and second major surfaces of the disposable filter cartridge so as to securely hold the disposable filter cartridge within the cartridge holder. Embodiment 13 is the cartridge holder of any of embodiments 11-12 wherein the cartridge holder comprises a inlet for unfiltered air, which inlet is defined between a lower end of the shroud and a lower end of the base, and wherein the inlet allows unfiltered air to enter an upstream plenum that is located forward of the disposable filter cartridge.

Embodiment 14 is a respirator comprising: a mask body; and at least one cartridge holder of any of embodiments 1-13 that is fluidically connected to the mask body. Embodiment 15 is the respirator of embodiment 14, further comprising a disposable filter cartridge that is installed in the cartridge holder.

Embodiment 16 is the respirator of any of embodiments 14-15 wherein when a disposable filter cartridge is installed within the cartridge holder and the cartridge holder is in a closed position, the respirator comprises a downstream air path that includes a downstream plenum that is located rearward of the disposable filter cartridge and that receives filtered air that flows through the filter cartridge, wherein the downstream air path further includes an air-exit passage of the cartridge holder that fluidly connects the downstream plenum of the cartridge holder to the mask body of the respirator, and wherein the downstream air path further includes a filtered-air-receiving interior of the mask body; and, wherein no portion of the fit-check device is located within or partially within, or in contact with, the downstream air path of the respirator. Embodiment 17 is the respirator of any of embodiments 14-16 wherein the respirator is a half-mask respirator, a full-mask respirator, or a powered-air respirator.

Embodiment 18 is a disposable filter cartridge that is configured to be installed into a cartridge holder that includes a negative-pressure fit-check device, wherein the disposable filter cartridge comprises a first air-permeable area of a major upstream surface of the disposable filter cartridge, at least a portion of which first air-permeable area is configured to be directly contacted by at least a portion of an air-impermeable area of a sealing platen of the fit-check device of the cartridge holder, so as to prevent flow of unfiltered air into the disposable filter cartridge. Embodiment 19 is the disposable filter cartridge of embodiment 18, wherein the disposable filter cartridge is configured to be installed into a cartridge holder of any of embodiments 1-13. Embodiment 20 is the disposable filter cartridge of any of embodiments 18-19 wherein the disposable filter cartridge comprises: a filter media comprising a first major side and a second, oppositely-facing major side; and, a casing with a first major portion that resides outwardly of the first major side of the filter media and that provides a first air-permeable area of a major front surface of the disposable filter cartridge, and with a second major portion that resides outwardly of the second, oppositely-facing major side of the filter media and that provides a second air-permeable area of a major rear surface of the disposable filter cartridge.

Embodiment 21 is the disposable filter cartridge of embodiment 20 wherein the casing is comprised of paperboard and wherein the first and second air-permeable areas of the first and second major surfaces of the disposable filter cartridge are respectively provided by a plurality of through-holes in the first and second major portions of the casing. Embodiment 22 is the disposable filter cartridge of any of embodiments 18-21 wherein the disposable filter cartridge is front-rear symmetric and front-rear reversible. Embodiment 23 is a kit comprising a plurality of disposable filter cartridges of any of embodiments 18-22.

Embodiment 24 is a cartridge holder that is configured to be fluidically connected to a mask body of a respirator and that is configured to securely hold a disposable filter cartridge within the cartridge holder, the cartridge holder including: a fit-check device comprising a sealing platen that is operatively connected to an actuator by which a user of the respirator can manually actuate the sealing platen back and forth between: a first, unsealed position in which airflow is permitted through a disposable filter cartridge that is held within the cartridge holder; and, a second, sealed position in which a major surface of at least a portion of an air-impermeable area of the sealing platen directly contacts at least a perimeter of an air-permeable area of a major upstream surface of the disposable filter cartridge so as to seal the air-permeable area of the major upstream surface of the disposable filter cartridge to prevent airflow into the disposable filter cartridge.

Embodiment 25 is a method of fit-checking a respirator comprising a mask body, a cartridge holder with a fit-check device and a disposable filter cartridge securely held within the cartridge holder, the method comprising: manually actuating a sealing platen of the fit-check device from a first, unsealed position in which airflow is permitted through the disposable filter cartridge that is held within the cartridge holder to a second, sealed position in which a major surface of at least a portion of an air-impermeable area of the sealing platen directly contacts at least a perimeter of an air-permeable area of a major upstream surface of the disposable filter cartridge so as to seal the air-permeable area of the major upstream surface of the disposable filter cartridge to prevent airflow into the disposable filter cartridge, and, inhaling. Embodiment 26 is the method of fit-checking the respirator of embodiment 25, wherein the cartridge holder is the cartridge holder of any of embodiments 1-13.

It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). To the extent that there is any conflict or discrepancy between this specification as written and the disclosure in any document incorporated by reference herein, this specification as written will control.

What is claimed is:

1. A respirator comprising a mask body and at least one cartridge holder that is fluidically connected to the mask body and comprising a disposable filter cartridge that is installed in the cartridge holder; the cartridge holder including:

a fit-check device comprising a sealing platen that is operatively connected to an actuator of the cartridge holder by which a user of the respirator can manually actuate the sealing platen back and forth between:

a first, unsealed position in which a gap is present between a surface of the sealing platen and a major surface of the disposable filter cartridge so that airflow is permitted through the disposable filter cartridge; and, a second, sealed position in which a rear surface of at least a portion of an air-impermeable area of the sealing platen directly contacts at least a perimeter of a first air-permeable area of a major front surface of the disposable filter cartridge; or, in which a front surface of at least a portion of an air-impermeable area of the sealing platen directly contacts at least a perimeter of a second air-permeable area of a major rear surface of the disposable filter cartridge, so as to seal the first air-permeable area of the major front surface of the disposable filter cartridge or to seal the second air-permeable area of the major rear surface of the disposable filter cartridge, to prevent airflow through the disposable filter cartridge; wherein the disposable filter cartridge is front-rear symmetric and front-rear reversible.

2. The respirator of claim 1, wherein when the sealing platen is in the second, sealed position, the rear surface of at least the portion of the air-impermeable area of the sealing platen directly contacts at least the perimeter of the first air-permeable area of the major front surface of the disposable filter cartridge so as to seal the first air-permeable area of the major front surface of the disposable filter cartridge so as to prevent flow of unfiltered air into the disposable filter cartridge.

3. The respirator of claim 2 wherein the first air-permeable area of the major front surface of the disposable filter cartridge comprises a plurality of through-holes, wherein the air-impermeable area of the sealing platen is a continuously imperforate area, and wherein when the sealing platen is in the second, sealed position, all of the through-holes of the plurality of through-holes of the first major surface of the disposable filter cartridge are individually occluded by local areas of the continuously imperforate area of the sealing platen.

4. The respirator of claim 3 wherein a first end of the sealing platen is pivotally connected to the filter cartridge holder by a pivotal connection and wherein the sealing platen is movable between a first, unsealed position in which at least a second end of the sealing platen that is distal to the pivotal connection is spaced forwardly away from the major front surface of the disposable filter cartridge, and a second, sealed position in which a rear surface of at least the second end of the sealing platen is in direct contact with a portion of the major front surface of the disposable filter cartridge.

5. The respirator of claim 2 wherein:

the first air-permeable area of the major front surface of the disposable filter cartridge comprises a plurality of through-holes that are arranged in a pattern;

the air-impermeable area of the sealing platen is a discontinuous air-impermeable area that is interrupted by through-holes that are arranged in a pattern that, when the sealing platen is in a first, unsealed position, at least partially overlaps the through-holes of the major front surface of the disposable filter cartridge;

at least a substantial portion of the rear surface of the sealing platen is in overlapping relation with, and is in contact with, at least a substantial portion of the first air-permeable area of the major front surface of the disposable filter cartridge; and, the sealing platen is slidably movable relative to the major front surface of the disposable filter cartridge in a direction that is at least substantially parallel to the major front surface of the disposable filter cartridge, between a first, unsealed position in which at least some portion of at least some of the through-holes of the sealing platen at least partially overlap at least some of the through-holes of the major front surface of the disposable filter cartridge so as to allow flow of unfiltered air into the disposable filter cartridge, and a second, sealed position in which no portion of any of the through-holes of the sealing platen overlap any portion of any of the through-holes of the major front surface of the disposable filter cartridge, in which second, sealed position all of the through-holes of the plurality of through-holes of the major front surface of the disposable filter cartridge are individually occluded by local areas of the discontinuous air-impermeable area of the sealing platen.

6. The respirator of claim 2 wherein the air-impermeable area of the sealing platen is a continuously imperforate area and wherein the sealing platen comprises a sealing flange that extends completely around a perimeter of the continuously imperforate air-impermeable area of the sealing platen and that extends generally rearward therefrom and that has a rearward surface; and, wherein when the sealing platen is in the second, sealed position the entirety of the rearward surface of the sealing flange is in direct contact with the perimeter of the air-permeable area of the first, forward-facing major surface of the disposable filter cartridge.

7. The respirator of claim 2, wherein the actuator comprises a major front surface of the sealing platen, which major front surface can be manually pushed rearward to actuate the sealing platen at least into the second, sealed position.

8. The respirator of claim 2, wherein the actuator comprises a movable handle that can be moved to actuate the sealing platen at least into the second, sealed position.

9. The respirator of claim 2, wherein the sealing platen and/or the actuator is biased toward the first, unsealed position so that the sealing platen will return from the second, sealed position to the first, unsealed position unless continued manual actuation pressure on the actuator is maintained by a user.

10. The respirator of claim 2, wherein the sealing platen, once actuated by a first manual actuation step into the second, sealed position, will remain in the second, sealed position without continued manual actuation pressure on the actuator by a user, and wherein a second manual actuation step is necessary in order to actuate the sealing platen from the second, sealed position to the first, unsealed position.

11. The respirator of claim 1 wherein when the cartridge holder is in a closed position, the respirator comprises a downstream air path that includes a downstream plenum that is located rearward of the disposable filter cartridge and that receives filtered air that flows through the filter cartridge, wherein the downstream air path further includes an air-exit passage of the cartridge holder that fluidly connects the downstream plenum of the cartridge holder to the mask body of the respirator, and wherein the downstream air path further includes a filtered-air-receiving interior of the mask body; and, wherein no portion of the fit-check device is located within or partially within, or in contact with, the downstream air path of the respirator.

12. The respirator of claim 1 wherein the respirator is a half-mask respirator, a full-mask respirator, or a powered-air respirator.

13. The respirator of claim 1 wherein the disposable filter cartridge comprises:

a filter media comprising a first major side and a second, oppositely-facing major side; and, a casing with a first major portion that resides outwardly of the first major side of the filter media and that provides the first air-permeable area of the major front surface of the disposable filter cartridge, and with a second major portion that resides outwardly of the second, oppositely-facing major side of the filter media and that provides the second air-permeable area of the major rear surface of the disposable filter cartridge.

14. The respirator of claim 13 wherein the casing is comprised of paperboard and wherein the first and second air-permeable areas of the first and second major surfaces of the disposable filter cartridge are respectively provided by a plurality of through-holes in the first and second major portions of the casing.

* * * * *